(12) United States Patent
Marchya et al.

(10) Patent No.: US 9,538,171 B2
(45) Date of Patent: Jan. 3, 2017

(54) TECHNIQUES FOR STREAMING VIDEO QUALITY ANALYSIS

(71) Applicant: Intel Corporation, Santa Clara, CA (US)

(72) Inventors: Dileep Marchya, Hillsboro, OR (US); Paul Zurcher, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 280 days.

(21) Appl. No.: 14/129,932

(22) PCT Filed: Jul. 23, 2013

(86) PCT No.: PCT/US2013/051701
§ 371 (c)(1),
(2) Date: Dec. 28, 2013

(87) PCT Pub. No.: WO2015/012813
PCT Pub. Date: Jan. 29, 2015

(65) Prior Publication Data
US 2015/0030084 A1 Jan. 29, 2015

(51) Int. Cl.
| | |
|---|---|
| H04N 21/24 | (2011.01) |
| H04N 19/136 | (2014.01) |
| H04N 19/44 | (2014.01) |
| H04N 19/85 | (2014.01) |
| G06K 9/64 | (2006.01) |
| G09G 5/00 | (2006.01) |
| G06K 9/00 | (2006.01) |
| H04N 17/00 | (2006.01) |

(Continued)

(52) U.S. Cl.
CPC ...... *H04N 17/004* (2013.01); *H04N 21/44008* (2013.01); *H04N 21/8358* (2013.01)

(58) Field of Classification Search
CPC .................... H04N 21/2407; H04N 19/00903; H04N 19/00139; H04N 19/00533
USPC ..................................... 375/240.26
See application file for complete search history.

(56) References Cited

U.S. PATENT DOCUMENTS

| | | | |
|---|---|---|---|
| 6,215,526 B1 * | 4/2001 | Barton ................... | H04N 7/025 348/398.1 |
| 7,143,353 B2 | 11/2006 | McGee et al. | |
| 2008/0310722 A1 | 12/2008 | Daniels et al. | |

(Continued)

OTHER PUBLICATIONS

International Search Report and Written Opinion received for PCT Patent Application No. PCT/US2013/051701, mailed Apr. 28, 2014, 14 pages.

*Primary Examiner* — Hee-Yong Kim

(57) ABSTRACT

Improved techniques for streaming video quality analysis are described. In one embodiment, for example, an apparatus may comprise a processor element, an identification component for execution by the processor element to determine frame identifications for each of a set of tagged video frames based on frame identifiers contained in the tagged video frames, each frame identifier comprising multiple markers, each marker comprising a macroblock pattern corresponding to a symbol according to a frame identification scheme, and an analysis component for execution by the processor element to determine one or more quality metrics by comparing the set of tagged video frames with a set of reference video frames based on the frame identifications. Other embodiments are described and claimed.

25 Claims, 10 Drawing Sheets

(51) Int. Cl.
*H04N 21/44* (2011.01)
*H04N 21/8358* (2011.01)

(56) References Cited

U.S. PATENT DOCUMENTS

2010/0061446 A1 3/2010 Hands et al.
2011/0096246 A1 4/2011 Dunn et al.
2012/0213286 A1 8/2012 Wu et al.

* cited by examiner

*FIG. 7*

_Storage Medium 700_

*Computer Executable Instructions for 500*

*Computer Executable Instructions for 600*

TECHNIQUES FOR STREAMING VIDEO QUALITY ANALYSIS

TECHNICAL FIELD

Embodiments described herein generally relate to the wireless streaming of video content.

BACKGROUND

Using wireless video streaming technology, a user may stream video content from a source device to a target device and view the video content on a display of the target device. This may desirable when, for example, the video content resides on a handheld device and the user wishes to view the video content on a display comprising a larger viewing area, such as a television. The process of encoding the video content for transmission from the source device to the target device and decoding the video content at the target device for presentation may involve some level of degradation of the quality of the video content. In order to measure such degradation, it may be desirable to compare the quality of the video content as it is presented at the target device with the quality of the video content prior to encoding and transmission. Such comparisons may depend on matching video frames at the target device with reference frames from the source device. Conventional techniques for such matching involve performing computationally intensive peak signal-to-noise ratio (PSNR) calculations for video frames of the target device against sets of reference frames from the source device.

BRIEF DESCRIPTION OF THE DRAWINGS

FIG. 7 illustrates one embodiment of a storage medium.

DETAILED DESCRIPTION

Various embodiments may be generally directed to improved techniques for streaming video quality analysis. More particularly, various embodiments may be generally directed to techniques for streaming video quality analysis according to which frame identifiers are inserted into video frames prior to transmission to a target device, such that the target device may match the video frames with corresponding reference frames based on the frame identifiers. In some embodiments, the frame identifiers may comprise macroblock-based patterns. In various such embodiments, the use of macroblock-based patterns may reduce the tendency of compression, encoding, and/or decoding that occurs in the streaming pipeline to inhibit recognition of the frame identifiers at the target device.

In one embodiment, for example, an apparatus may comprise a processor element, an identification component for execution by the processor element to determine frame identifications for each of a set of tagged video frames based on frame identifiers contained in the tagged video frames, each frame identifier comprising multiple markers, each marker comprising a macroblock pattern corresponding to a symbol according to a frame identification scheme, and an analysis component for execution by the processor element to determine one or more quality metrics by comparing the set of tagged video frames with a set of reference video frames based on the frame identifications. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
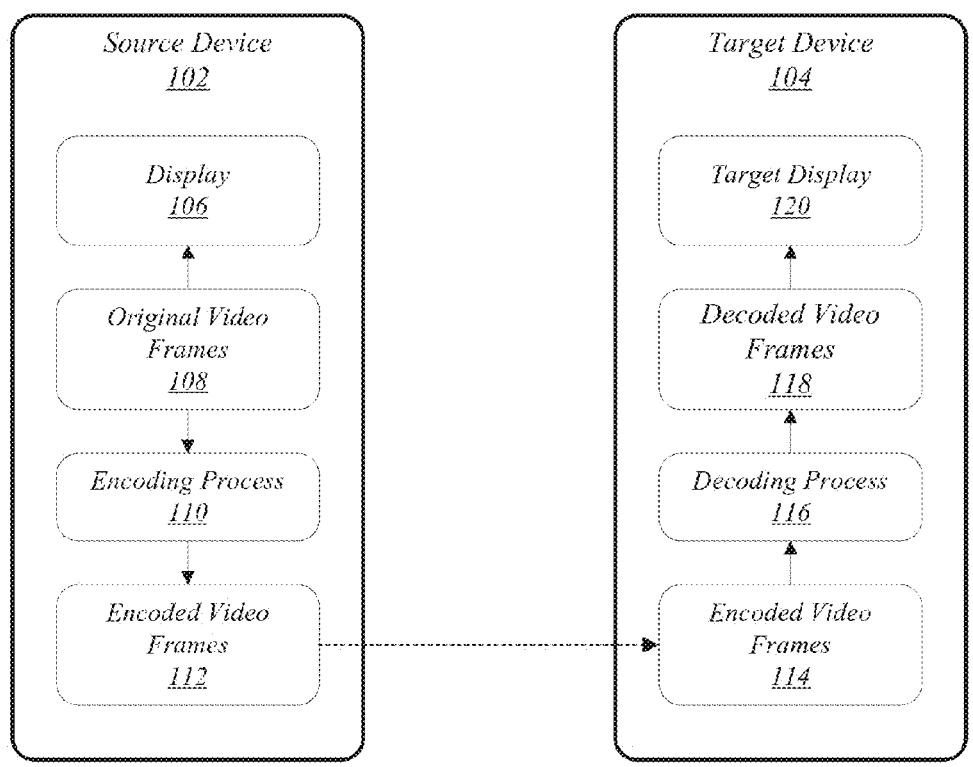
FIG. 1 illustrates one embodiment of an operating environment.

FIG. 1 illustrates an embodiment of an operating environment 100 for various embodiments. As shown in FIG. 1, a source device 102 communicates with a target device 104. In some embodiments, source device 102 may comprise a primary device by which video content is displayed, and target device 104 may comprise a secondary device to which the video content is wirelessly streamed by source device 102 for display by the target device 104. For example, in various embodiments, source device 102 may comprise a mobile communications device, target device 104 may comprise a television, and source device 102 may stream video content to target device 104 using Intel® Wireless Display ("WiDi") technology. The embodiments are not limited to this example.

In some embodiments, source device 102 may comprise a display 106. Display 106 may comprise any display device capable of displaying video content. Examples for display 106 may include an integrated display screen of a computing and/or communications device such as a mobile phone or tablet computer, a television, a monitor, a projector, and a computer screen. In one embodiment, for example, display 106 may be implemented by a liquid crystal display (LCD), light emitting diode (LED) or other type of suitable visual interface. Display 106 may comprise, for example, a touch-sensitive color display screen. In various implementations, display 106 may comprise one or more thin-film transistors (TFT) LCD including embedded transistors. In various embodiments, display 106 may not be comprised within source device 102, but rather may be coupled to source device 102. The embodiments are not limited in this context.

In some embodiments, source device 102 may be operative on display 106 to display original video frames 108. In various embodiments, original video frames 108 may comprise one or more frames of visual information that collectively constitute part or all of a particular video content item. For example, in one embodiment, original video frames 108 may comprise a motion picture, and source device 102 may be operative on display 106 to display original video frames 108 and thus to present the motion picture. The embodiments are not limited to this example.

In some embodiments, source device 102 may be operative to apply an encoding process 110 to original video frames 108 to obtain encoded video frames 112. In various embodiments, encoded video frames 112 may comprise encoded versions of original video frames 108 that are more suitable for wireless transmission to target device 104. For example, encoding process 110 may be operative to compress original video frames 108, reduce a resolution of original video frames 108, and/or convert original video frames 108 to a format compatible with a transmission protocol used for transmission of encoded video frames 112 to target device 104. In one embodiment, encoding process 110 may be operative to generate encoded video frames 112 that are suitable for transmission to target device 104 over a WiDi connection. In some embodiments, source device 102 may be operative to generate encoded video frames 112 and transmit them to target device 104 without actually displaying the corresponding original video frames 108 on display 106. The embodiments are not limited in this context.

In various embodiments, target device 104 may receive encoded video frames 114 from source device 102. In some embodiments, the received encoded video frames 114 may comprise all of encoded video frames 112. In various other embodiments, one or more of encoded video frames 112 may be lost due to frame drop or other errors, and the received encoded video frames 114 may comprise less than all of encoded video frames 112. In some embodiments, encoded video frames 114 may be received in the same order as that in which their corresponding original video frames 108 are arranged in video content presented on display 106 of source device 102. In various other embodiments, one or more of encoded video frames 114 may be received out of order with respect to the order of their corresponding original video frames 108. The embodiments are not limited in this context.

In some embodiments, target device 104 may be operative to apply a decoding process 116 to obtain decoded video frames 118. In various embodiments, decoded video frames 118 may comprise video frames in a format suitable for display on a target display 120 comprised in or coupled to target device 104. Target display 120 may comprise any display device capable of displaying video content, and examples for target display 120 may include any of the above examples presented with respect to display 106. In some embodiments, decoded video frames 118 may exhibit some level of quality degradation with respect to their corresponding original video frames 108. For example, in various embodiments, the process of encoding original video frames 108, wirelessly transmitting encoded video frames 112 to target device 104, and decoding the received encoded video frames 114 to obtain decoded video frames 118 may involve associated compression loss, channel loss, distortion, and/or artifact effects, resulting in video quality degradation. The embodiments are not limited in this context.

In some embodiments, it may be desirable to measure the video quality degradation effects incurred in the course of streaming video content from source device 102 to target device 104. In various embodiments, this may be accomplished by comparing decoded video frames 118 to original video frames 108, and applying one or more analysis techniques to determine one or more quality metrics. In some embodiments, comparing decoded video frames 118 to original video frames 108 may comprise comparing individual decoded video frames 118 with the particular original video frames 108 to which they correspond. The embodiments are not limited in this context.

In various embodiments, target device 104 may not have direct knowledge of which original video frames 108 correspond to which decoded video frames 118. For example, due to latency effects, the potential for dropped frames or for frames being received out of order, or other factors, successive decoded video frames 118 may not necessarily correspond to successive original video frames 108. In order to allow proper comparison of decoded video frames 118 with original video frames 108, frame identities such as frame numbers may be determined for decoded video frames 118 and then matched with frame identities for original video frames 108. In some conventional systems, the determination of frame identities for decoded video frames is performed using correlative approximation techniques. According to such techniques, decoded video frames 118 may be initially numbered based on their order of receipt, and then compared with a set of original video frames 108 centered around a like-numbered frame. This comparison may involve the determination of a peak signal-to-noise ratio (PSNR) value for the entirety of a given decoded video frame 118 as measured against the entireties of each of the set of original video frames 108. The original video frame 108 associated with the highest PSNR measurement for the decoded video frame 118 may be identified as the original video frame 108 corresponding to that decoded video frame 118. The decoded video frame 118 may then be compared to the original video frame 108 in the course of measuring the video quality degradation of the system.

For some types of video content, such as high frame rate and/or low motion video, neighboring video frames may be very similar. In such cases, PSNR values computed against a set of original video frames 108 of a given decoded video frame 118 may exhibit little or no difference from each other. Additionally, encoder compression loss may not be even across original video frames 108. As a result, for some types of content, conventional techniques may frequently result in mismatches between decoded video frames 118 and original video frames 108. Furthermore, the computation of PSNR values against sets of original video frames 108 for numerous decoded video frames 118 may be computationally prohibitive, especially for high-definition video content Improved techniques for streaming video quality analysis are disclosed that may address one or more shortcomings associated with such conventional techniques.

Figure 2:
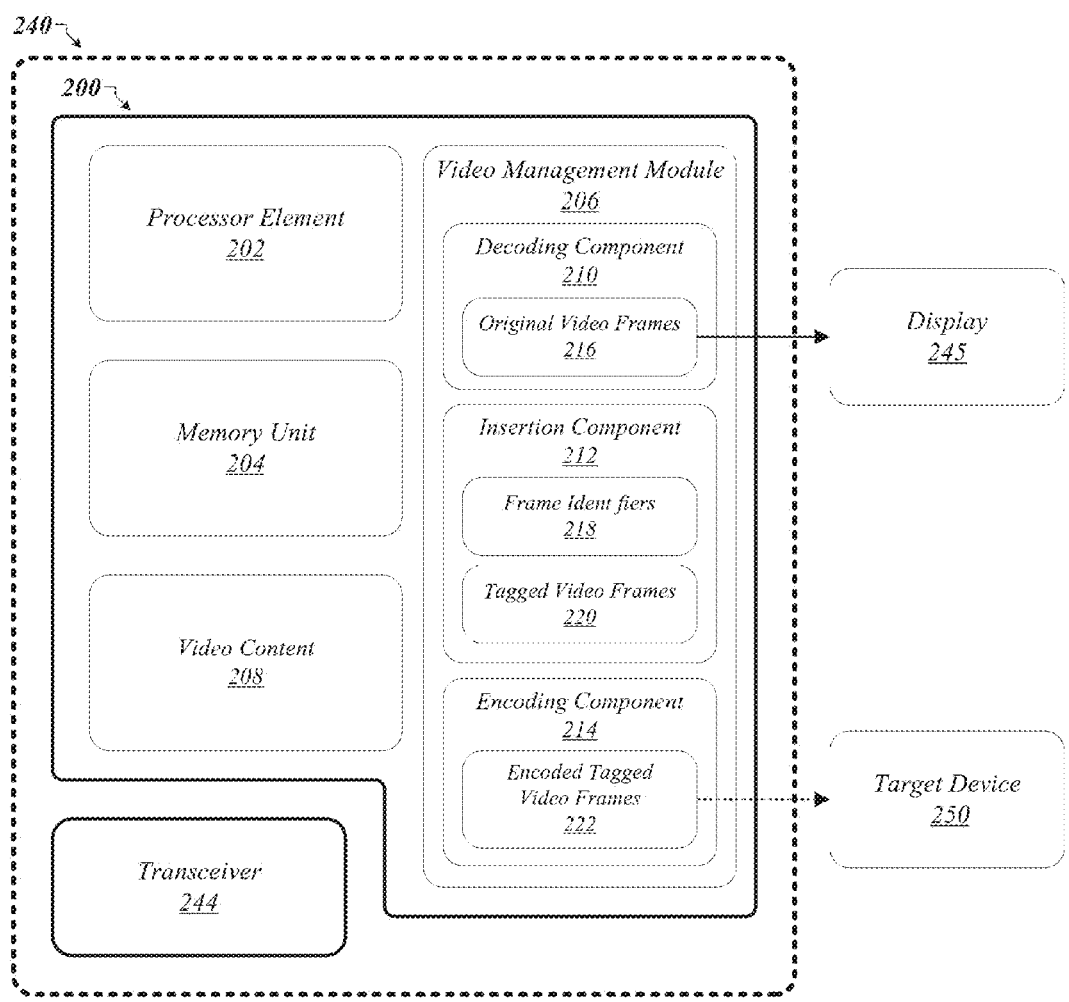
FIG. 2 illustrates one embodiment of a first apparatus and one embodiment of a first system.

FIG. 2 illustrates a block diagram of an apparatus 200. Apparatus 200 may comprise an example of a source device for wirelessly streamed video content, such as source device 102 of FIG. 1. As shown in FIG. 2, apparatus 200 comprises multiple elements including a processor element 202, a memory unit 204, and a video management module 206. The embodiments, however, are not limited to the type, number, or arrangement of elements shown in this figure.

In various embodiments, apparatus 200 may comprise processor element 202. Processor element 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor element 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor element 202, or alternatively some portion or all of memory unit 204 may be disposed on an integrated circuit or other medium, for example a hard disk drive, that is external to the integrated circuit of processor element 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a video management module 206. Video management module 206 may comprise any combination of circuitry, logic, and/or instructions operable to decode, encode, order, modify, present, and/or otherwise manage one or more video frames. In an example embodiment, video management module 206 may comprise programming logic within a video editing and/or playback application. In another example embodiment, video management module 206 may comprise a video management chip or integrated circuit. The embodiments are not limited to these examples.

FIG. 2 also illustrates a block diagram of a system 240. System 240 may comprise any of the aforementioned elements of apparatus 200. System 240 may further comprise a transceiver 244. Transceiver 244 may include one or more radios capable of transmitting and receiving signals using various suitable wireless communications techniques. Such techniques may involve communications with one or more remote devices according to one or more protocols for wireless display communications, such as communications over a WiDi connection. Such techniques may additionally or alternatively involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 244 may operate in accordance with one or more applicable standards in any version. The embodiments, however, are not limited to these examples.

In general operation, apparatus 200 and/or system 240 may be operative to insert identification information into frames of video content based on a frame identification scheme, to support the measurement of video quality metrics by a target device receiving the video content. In various embodiments, apparatus 200 and/or system 240 may be operative to insert frame identifiers 218 into frames of video content 208 to obtain tagged video frames 220, to encode the tagged video frames 220, and to wirelessly stream the encoded tagged video frames 222 to a target device. The embodiments are not limited in this context.

In some embodiments, video management module 206 may comprise a decoding component 210. Decoding component 210 may comprise logic, circuitry, and/or instructions operative to perform decoding operations on video content 208. In various embodiments, video content 208 may comprise video in an encoded format, such as the International Telecommunication Union Telecommunication Standardization Sector (ITU-T) H.264 standard published Apr. 4, 2012, the International Organization for Standardization/International Electrotechnical Commission (ISO/IEC) 14496-10:2012 standard published Apr. 26, 2012, any previous or subsequent versions of these standards, and/or any other video encoding format. In some embodiments, decoding component 210 may be operative to decode video content 208 to obtain original video frames 216. In various embodiments, original video frames 216 may comprise video frames in an un-encoded format usable for presentation of video content 208 on a display. The embodiments are not limited in this context.

In some embodiments, video management module 206 may comprise insertion component 212. Insertion component 212 may comprise logic, circuitry, and/or instructions operative to insert frame identifiers 218 into original video frames 216 to obtain tagged video frames 220. In various embodiments, frame identifiers 218 may comprise visual elements that are inserted into original video frames 216. For example, in some embodiments, frame identifiers 218 may comprise visual markers that are inserted into original video frames 216 and that represent numbers, letters, characters, symbols, and/or other information usable to identify original video frames 216.

In various embodiments, insertion component 212 may be operative to insert frame identifiers 218 at fixed positions within original video frames 216. For example, in some embodiments, insertion component 212 may be operative to insert a frame identifier 218 at a same position (x,y) within each original video frame 216. In various embodiments, each frame identifier 218 may comprise a series of markers, where each marker in the series is comprised of an arrangement of macroblocks, such as an arrangement of black and/or white macroblocks. In some embodiments, for any particular original video frame 216, insertion component 212 may be operative to select markers comprising patterns that are defined to represent digits, letters, characters, and/or other information making up an identifier for the original video frame 216. In various embodiments, particular markers may be defined to represent particular digits, letters, characters, and/or other information by a frame identification scheme.

For example, in various embodiments, a frame identification scheme may define particular marker patterns for each hexadecimal digit 0 to F, and for a particular original video frame 216, insertion component 212 may be operative to insert a frame identifier 218 comprising markers representing the digits of a hexadecimal frame number for that original video frame 216 according to the frame identification scheme. In some embodiments, each marker may comprise four macroblocks. In various such embodiments, each marker may comprise a 2-by-2 arrangement of macroblocks. In some embodiments, insertion component 212 may be operative to include a reference marker at a beginning of each frame identifier 218. In various embodiments, the reference marker may comprise a marker defined by the frame identification scheme to indicate that the markers that it precedes represent frame identification information such as a frame number. The embodiments are not limited in this context.

One advantage associated with some embodiments may be that by utilizing markers comprising arrangements of macroblocks such as black and/or white macroblocks, frame identifiers 218 are realized that are less susceptible to being altered by compression in the spatial and/or temporal domains. For example, according to some conventional frame identification schemes, markers used to represent frame identities may not comprise arrangements of macroblocks, but rather may comprise pixel patterns or other symbols. The use of such non-macroblock-based pixel patterns or other symbols may increase the tendency of compression, encoding, and/or decoding that occurs in the streaming pipeline to inhibit recognition of the frame identifiers at the target device. In contrast, the use of markers comprising macroblock arrangements according to the techniques described herein may tend to yield frame identifiers that are more accurately recognized at the target device.

A second advantage associated with various embodiments may be that inserting frame identifiers 218 may involve performing less substantial modifications of original video frames 216 than those performed according to conventional techniques. For example, according to some conventional frame identifications schemes, a band may be inserted in a bottom portion of an original image, identifying information may be inserted within the band, and the original image may either be scaled and/or truncated in order to make room for the band. According to the techniques described herein, original video frames 216 may be tagged with frame identifiers 218 without the need for scaling and/or truncating the original video frames 216, and thus the integrity of the original video frames 216 may be better preserved.

Another advantage associated with various embodiments may be that to the extent that encoding causes bleed effects with respect to frame identifiers 218, those effects will generally reside at edges of the markers therein, and thus will be less likely to inhibit recognition of the frame identifiers 218. Other advantages may be associated with some embodiments, and the embodiments are not limited in this context.

Figure 3:
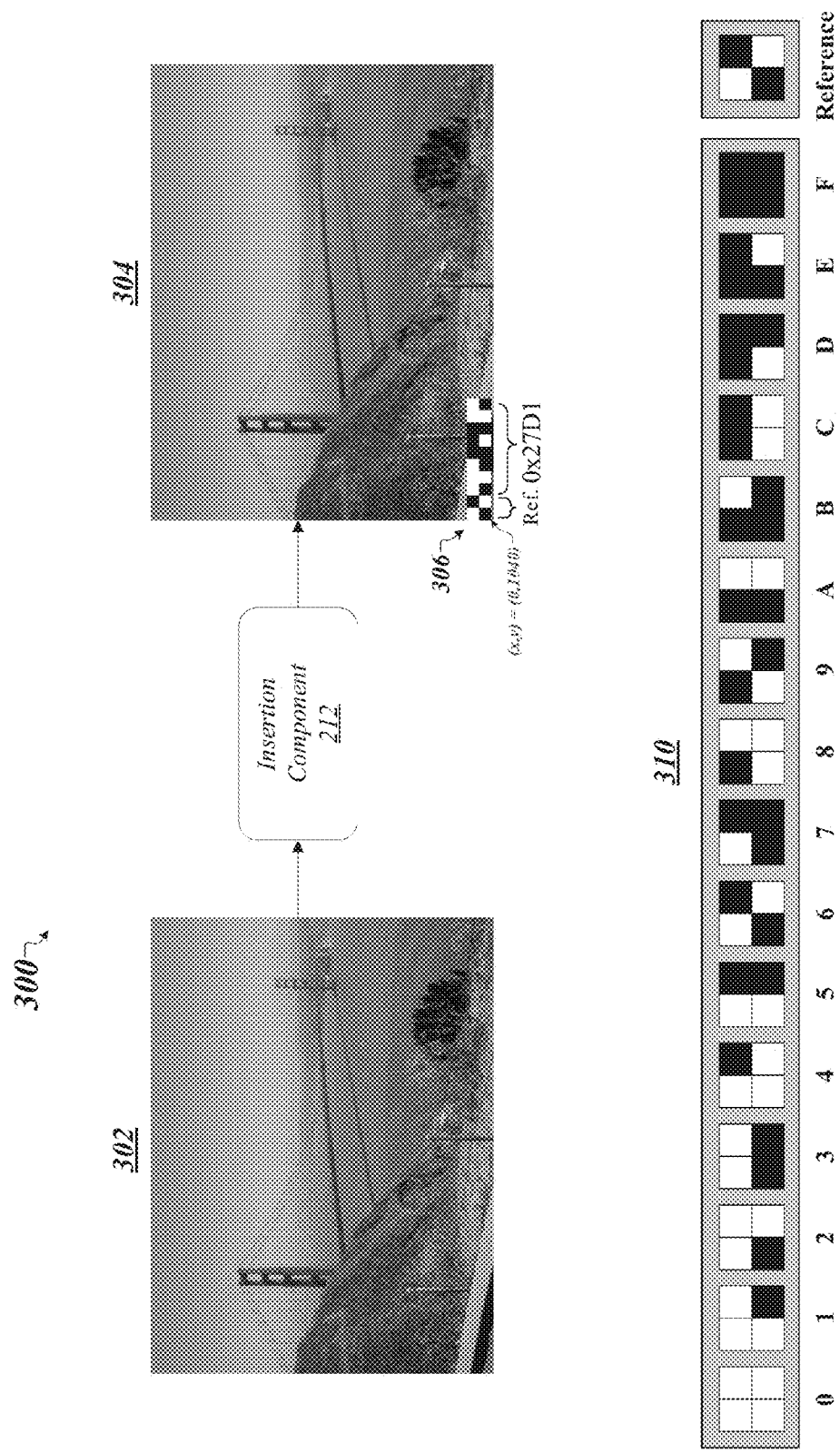
FIG. 3 illustrates one embodiment of an insertion operation.

FIG. 3 illustrates an embodiment of an insertion operation 300 such as may be performed by insertion component 212 of FIG. 2 according to a frame identification scheme. As shown in FIG. 3, insertion component 212 receives an original video frame 302. Based on a marker definition table 310 for the frame identification scheme, insertion component 212 inserts a frame identifier 306 into the original video frame 302 to obtain a tagged video frame 304. More particularly, insertion component inserts frame identifier 306 such that its bottom-left most portion resides at the coordinates x=0, y=1040, and such that it represents the hexadecimal value 0x27D1. The frame identifier in the example of FIG. 3 comprises a total of five markers. The first marker comprises a reference marker, and the remaining four markers comprise markers representing the hexadecimal digits 2, 7, D, and 1, as defined in marker definition table 310. The embodiments are not limited to the example of FIG. 3.

Returning to FIG. 2, in some embodiments, video management module 206 may comprise encoding component 214. Encoding component 214 may comprise logic, circuitry, and/or instructions operative to encode tagged video frames 220 to obtain encoded tagged video frames 222 comprising a format suitable for wireless transmission to a target device 250 according to a wireless display communications protocol. For example, in various embodiments, encoding component 214 may be operative to encode tagged video frames 220 for wireless streaming to target device 250 over a WiDi connection via transceiver 244. The embodiments are not limited to this example.

In some embodiments, apparatus 200 and/or system 240 may comprise or be coupled to a display 245. Display 245 may comprise any display device capable of displaying video content, and may be the same as or similar to display 106 of FIG. 1. In various embodiments, apparatus 200 and/or system 240 may be operative both to transmit encoded tagged video frames 222 to target device 250 and to cause original video frames 216 to be presented on display 245. In some other embodiments, apparatus 200 and/or system 240 may be operative to transmit encoded tagged video frames 222 to target device 250, but may not be operative to cause original video frames 216 to be presented on display 245. The embodiments are not limited in this context.

Figure 4:
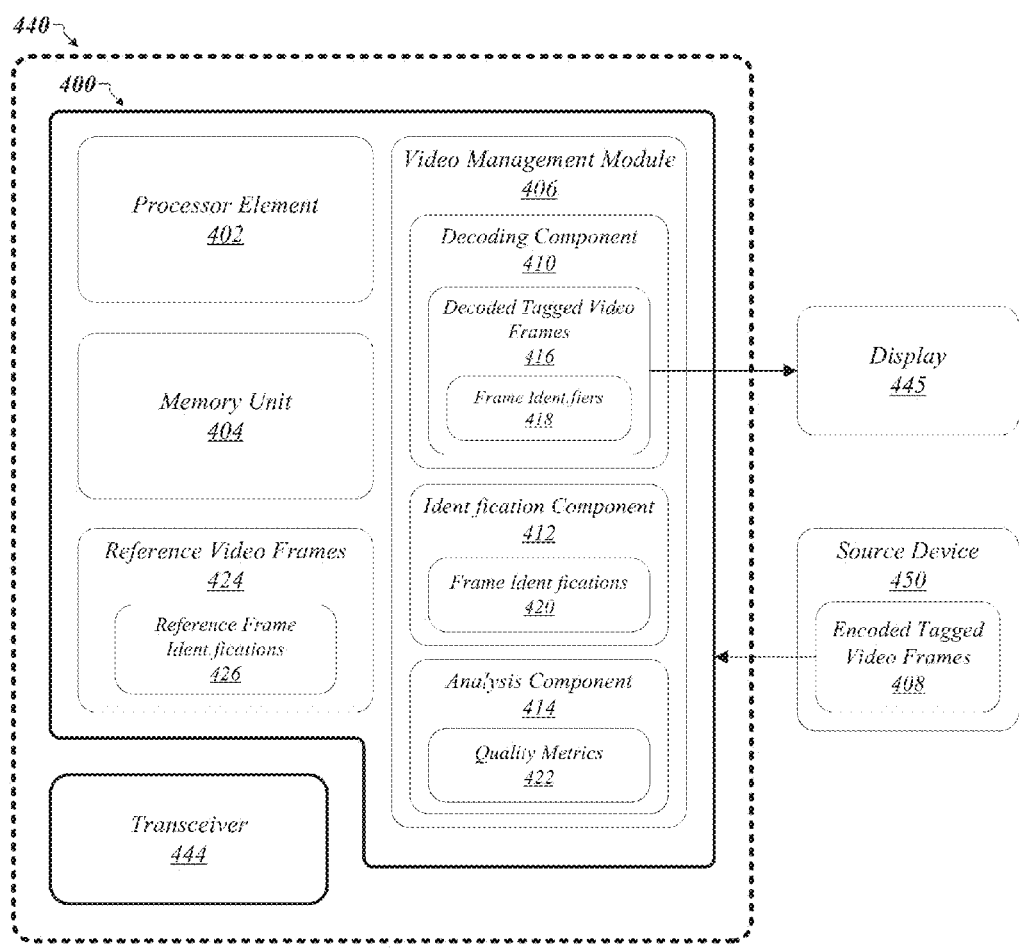
FIG. 4 illustrates one embodiment of a second apparatus and one embodiment of a second system.

FIG. 4 illustrates a block diagram of an apparatus 400. Apparatus 400 may comprise an example of a target device for wirelessly streamed video content, such as target device 104 of FIG. 1 and/or target device 250 of FIG. 2. As shown in FIG. 4, apparatus 400 comprises multiple elements including a processor element 402, a memory unit 404, and a video management module 406. The embodiments, however, are not limited to the type, number, or arrangement of elements shown in this figure.

In various embodiments, apparatus 400 may comprise processor element 402. Processor element 402 may be implemented using any processor or logic device, including any of the examples presented above with respect to processor element 202 of FIG. 2. The embodiments are not limited in this context.

In some embodiments, apparatus 400 may comprise or be arranged to communicatively couple with a memory unit 404. Memory unit 404 may be implemented using any machine-readable or computer-readable media capable of storing data, including both volatile and non-volatile memory, including any of the examples presented above with respect to memory unit 204 of FIG. 2. It is worthy of note that some portion or all of memory unit 404 may be included on the same integrated circuit as processor element 402, or alternatively some portion or all of memory unit 404 may be disposed on an integrated circuit or other medium, for example a hard disk drive, that is external to the integrated circuit of processor element 402. Although memory unit 404 is comprised within apparatus 400 in FIG. 4, memory unit 404 may be external to apparatus 200 in some embodiments. The embodiments are not limited in this context.

In various embodiments, apparatus 400 may comprise a video management module 406. Video management module 406 may comprise any combination of circuitry, logic, and/or instructions operable to decode, encode, order, modify, present and/or otherwise manage one or more video frames. In an example embodiment, video management module 406 may comprise programming logic within a video playback and/or diagnostic analysis application. In another example embodiment, video management module 406 may comprise a video management chip or integrated circuit. The embodiments are not limited to these examples.

FIG. 4 also illustrates a block diagram of a system 440. System 440 may comprise any of the aforementioned elements of apparatus 400. System 440 may further comprise a transceiver 444. Transceiver 444 may include one or more radios capable of transmitting and receiving signals using various suitable wireless communications techniques, and may be the same as or similar to transceiver 244 of FIG. 2. The embodiments, however, are not limited to these examples.

In some embodiments, apparatus 400 and/or system 440 may comprise or be coupled to a display 445. Display 445 may comprise any display device capable of displaying video content, and may be the same as or similar to target display 120 of FIG. 1. In various embodiments, apparatus 400 and/or system 440 may be operative to cause video content to be presented on display 445 by processing encoded tagged video frames 408. The embodiments are not limited in this context.

In general operation, apparatus 400 and/or system 440 may be operative to measure the quality of a wireless video streaming process. In some embodiments, apparatus 400 and/or system 440 may be operative to receive encoded tagged video frames 408 comprising frame identifiers from a source device 450, decode the encoded tagged video frames 408 to obtain decoded tagged video frames 416, identify frame identifications 420 for the decoded tagged video frames based on frame identifiers 418 within the decoded tagged video frames 416, and generate one or more quality metrics 422 by comparing the decoded tagged video frames 416 to reference video frames 424 using the frame identifications 420. The embodiments are not limited in this context.

In various embodiments, video management module 406 may comprise decoding component 410. Decoding component 410 may comprise logic, circuitry, and/or instructions operative to perform decoding operations on encoded tagged video frames 408. In some embodiments, encoded tagged video frames 408 may comprise video frames encoded in a format for wireless communication of display information. For example, in various embodiments, encoded tagged video frames 408 may comprise video frames encoded for transmission over a WiDi connection over which they are received by apparatus 400. In some embodiments, decoding component 410 may be operative to decode encoded tagged video frames 408 to obtain decoded tagged video frames 416. In various embodiments, decoded tagged video frames 416 may comprise video frames in an un-encoded format suitable for presentation on a display. The embodiments are not limited in this context.

In some embodiments, video management module 406 may comprise identification component 412. Identification component 412 may comprise logic, circuitry, and/or instructions operative to determine frame identifications 420 for decoded tagged video frames 416 based on frame identifiers 418 comprised within decoded tagged video frames 416. In various embodiments, frame identifiers 418 may comprise visual elements within decoded tagged video frames 416. For example, in some embodiments, frame identifiers 418 may comprise arrangements of visual markers corresponding to digits, letter, characters, symbols, or other information, such as those described in marker definition table 310 of FIG. 3. In various embodiments, frame identifications 420 may comprise frame numbers for decoded tagged video frames 416. The embodiments are not limited in this context.

In some embodiments, identification component 412 may be operative to perform one or more feature recognition techniques in order to process frame identifiers 418 and determine frame identifications 420. In various embodiments, identification component 412 may be operative to search for the presence of a reference marker in each decoded tagged video frame 416 by determining a PSNR for a region situated at particular coordinates (x,y) against a known reference marker. For example, with reference to tagged video frame 304 of FIG. 3, identification component 412 may be operative to determine a PSNR for the 2 macroblock by 2 macroblock region extending upwards and to the right from the coordinates (0,1040), against the reference marker defined in marker definition table 310. In some embodiments, identification component 412 may be operative to compare the PSNR to a threshold value to determine whether the analyzed region comprises a reference marker. In various embodiments, for example, identification component 412 may be operative to determine that the analyzed region contains a reference marker if the PSNR exceeds a threshold value of approximately 40 dB. In some embodiments, identification component 412 may be operative to compute the PSNR based on luminance values for the pixels in the analyzed region. In various embodiments, if identification component 412 determines that the analyzed region does not contain a reference marker, it may determine that no frame identifier 418 is present, and may not determine a frame identification 420 for the decoded tagged video frame 416. The embodiments are not limited in this context.

In some embodiments, if identification component 412 determines that the analyzed region contains a reference marker, it may conclude that the analyzed decoded tagged video frame 416 comprises a frame identifier 418. In various embodiments, identification component 412 may be operative to analyze a region adjacent to the reference marker in order to determine a frame identification 420 for the tagged video frame 416 based on the frame identifier 418. In some embodiments, identification component 412 may be operative to determine the region to be analyzed based on a known number of markers comprised within each frame identifier 418. For example, with reference to tagged video frame 304 of FIG. 3, identification component 412 may be operative to analyze a region to the right of the reference marker comprising a size equal to four markers, based on a defined system parameter specifying that frame identifiers 418 each comprise a reference marker followed by four markers representing hexadecimal digits. The embodiments are not limited in this context.

In various embodiments, for each region in which it expects to find a distinct marker, identification component 412 may be operative to compute a PSNR for that region against each of a plurality of defined marker patterns. Identification component 412 may then be operative to determine that the region indicates a digit, letter, character, symbol, or other information corresponding to a marker pattern associated with the highest computed PSNR. For example, with reference to tagged video frame 304 of FIG. 3, identification component 412 may be operative to compute a PSNR for the 2 macroblock by 2 macroblock region immediately to the right of the reference marker against each of the 16 markers defined in marker definition table 310, determine that the highest computed PSNR is associated with the marker corresponding to the hexadecimal digit 2, and determine that a first hexadecimal digit of a frame identification 420 for the tagged video frame 304 is equal to 2. Identification component 412 may repeat this process with respect to the remaining markers in tagged video frame 304, and ultimately determine that the frame identification 420 for the tagged video frame 304 comprises the hexadecimal value 0x27D1. The embodiments are not limited to this example.

In some embodiments, video management module 406 may comprise analysis component 414. Analysis component 414 may comprise logic, circuitry, and/or instructions operative to generate quality metrics 422 to measure the quality of a wireless video streaming process according to which apparatus 400 and/or system 440 receives and decodes a wireless video stream from source device 450. In various embodiments, analysis component 414 may be operative to measure video quality degradation associated with the wireless video streaming process. For example, with reference to FIG. 2, in some embodiments, analysis component 414 may be operative to compare a quality of presentation of video content 208 at apparatus 400 and/or system 440 to a quality of presentation of video content 208 at apparatus 200 and/or system 240. The embodiments are not limited in this context.

In various embodiments, analysis component 414 may be operative to determine quality metrics 422 by comparing decoded tagged video frames 416 to reference video frames 424. In some embodiments, reference video frames 424 may comprise frames of video content in a same format as that in which they are decoded and/or presented at the source device 450. For example, with reference to FIG. 2, reference video frames 424 may comprise frames of video content 208 in a same format as that of original video frames 216. In various embodiments, reference video frames 424 may be stored in memory unit 404, stored in a non-removable storage medium such as a hard drive, stored in a removable storage medium such as a digital video disk (DVD), and/or received from source device 450 or from another remote device. The embodiments are not limited in this context.

In some embodiments, analysis component 414 may be operative to compare decoded tagged video frames 416 to reference video frames 424 based on the frame identifications 420 for decoded tagged video frames 416 and on known frame identifications 426 for reference video frames 424. More particularly, analysis component 414 may be operative to compare each decoded tagged video frame 416 to a reference video frame 424 comprising a frame identification 426 that matches the frame identification 420 for the decoded tagged video frame 416. In various embodiments, analysis component 414 may be operative to compute a PSNR value for each decoded tagged video frame 416 against its respective corresponding reference video frame 424. In some embodiments, the PSNR value may be computed for the entirety of each tagged video frame 416 against its respective corresponding reference video frame 424, excluding the region in the tagged video frame 416 containing the frame identifier 418. In various embodiments, the frame quality measurements may be repeated by changing frame identifier positions within decoded tagged video frames 416 and averaging the resulting PSNRs. In some embodiments, analysis component 414 may be operative to generate one or more quality metrics 422 indicating a comparative level of quality of decoded tagged video frames 416 in comparison to reference video frames 424, based on the calculated PSNRs. The embodiments are not limited in this context.

In various embodiments, analysis component 414 may be operative to utilize frame identifications 420 to detect out-of-order, duplicate, and/or missing frames. For example, if a particular decoded tagged video frame 416 comprises a higher frame number than a subsequent decoded tagged video frame 416, analysis component 414 may be operative to determine that the two decoded tagged video frames 416 are out of order. In another example, if two decoded tagged video frames 416 comprise a same frame identification 420, analysis component 414 may be operative to determine that the two decoded tagged video frames 416 are duplicates. In some embodiments, analysis component 414 may be operative to generate one or more quality metrics 422 indicating an extent to which it has detected out-of-order, duplicate, and/or missing frames in decoded tagged video frames 416. The embodiments are not limited in this context.

In various embodiments, analysis component 414 may be operative to determine a latency associated with the wireless video streaming process according to which apparatus 400 and/or system 440 receives and decodes encoded tagged video frames 408. For example, in some embodiments, source device 450 may log a time of transmission and frame identification for each encoded tagged video frame 408, and apparatus 400 and/or system 440 may be operative to log a time of arrival for each encoded tagged video frame 408. Once identification component 412 has determined frame identifications 420, analysis component 414 may be operative to utilize the frame identifications 420 to determine transit times for encoded tagged video frames 408 based on their times of transmission and times of arrival. Analysis component 414 may then be operative to determine one or more quality metrics 422 comprising measurements of a latency associated with the wireless video streaming process, based in the determined transit times for encoded tagged video frames 408. For example, in various embodiments in which apparatus 400 and/or system 440 receives encoded tagged video frames 408 over a WiDi connection, analysis component 414 may be operative to determine a latency for the WiDi connection based on the measured transit times for encoded tagged video frames 408. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor element, or any combination thereof. The embodiments are not limited in this context.

Figure 5:
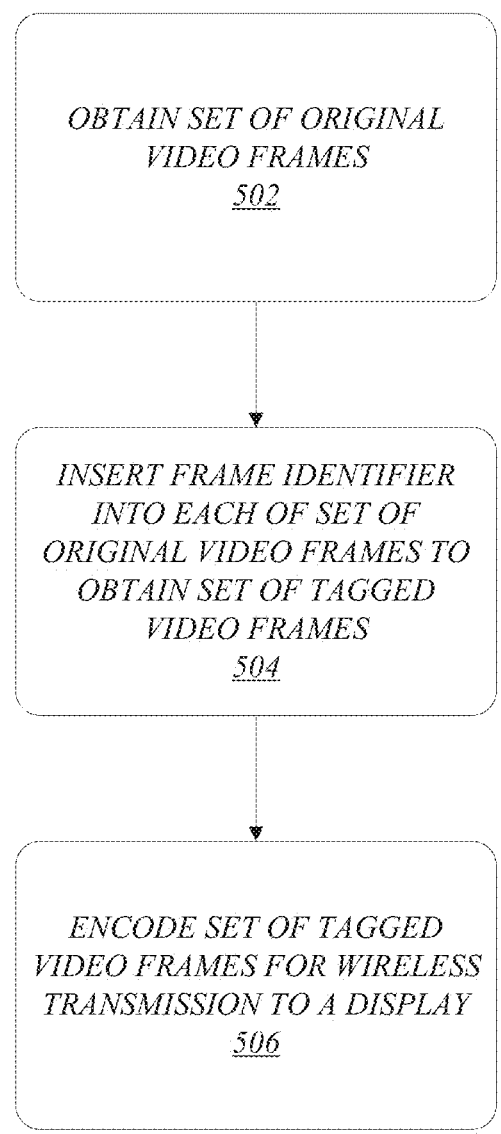
FIG. 5 illustrates one embodiment of a first logic flow.

FIG. 5 illustrates one embodiment of a logic flow 500, which may be representative of the operations executed by one or more embodiments described herein. For example, logic flow 500 may be representative of operations performed by source device 102 of FIG. 1, and/or apparatus 200 and/or system 240 of FIG. 2. As shown in logic flow 500, a set of original video frames may be obtained at 502. For example, decoding component 210 of FIG. 2 may be operative to obtain a set of original video frames 216 by decoding video content 208. At 504, frame identifiers may be inserted into each of the set of original video frames to obtain a set of tagged video frames. For example, insertion component 212 of FIG. 2 may be operative to insert a frame identifier 218 into each of the set of original video frames 216 to obtain a set of tagged video frames 220. At 506, the set of tagged video frames may be encoded for wireless transmission to a display. For example, encoding component 214 of FIG. 2 may be operative to encode the set of tagged video frames 220 for wireless transmission to a target device 250 via transceiver 244, and target device 250 may comprise a display. The embodiments are not limited to these examples.

Figure 6:
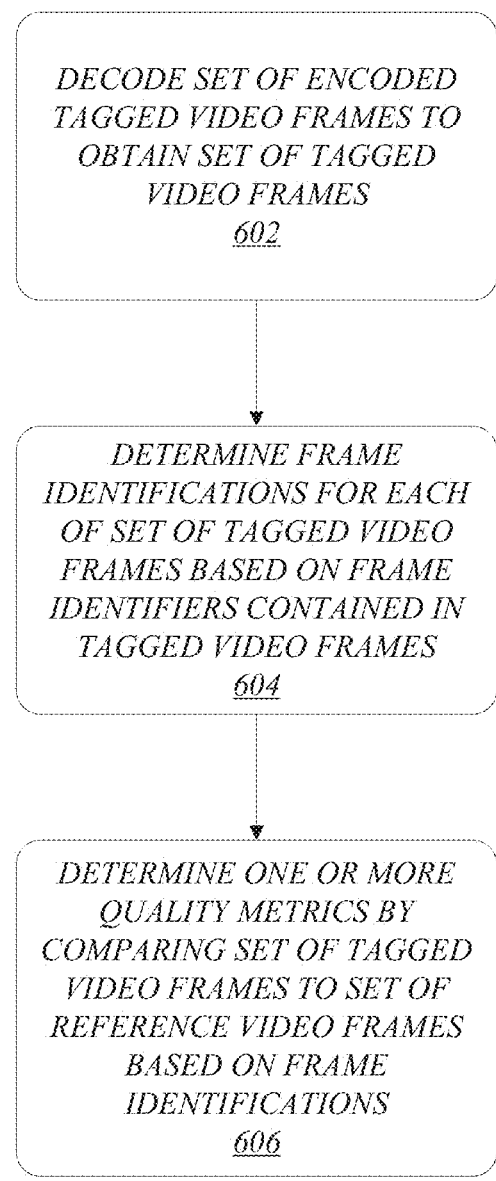
FIG. 6 illustrates one embodiment of a second logic flow.

FIG. 6 illustrates one embodiment of a logic flow 600, which may be representative of the operations executed by one or more embodiments described herein. For example, logic flow 600 may be representative of operations performed by target device 104 of FIG. 1, and/or apparatus 400 and/or system 440 of FIG. 4. As shown in logic flow 600, at 602, a set of encoded tagged video frames may be decoded to obtain a set of tagged video frames. For example, decoding component 410 of FIG. 4 may be operative to decode a set of encoded tagged video frames 408 to obtain a set of decoded tagged video frames 416. At 604, frame identifications may be determined for each of the set of tagged video frames based on frame identifiers contained in the tagged video frames. For example, identification component 412 of FIG. 4 may be operative to determine frame identifications 420 for each of the set of decoded tagged video frames 416 based on the frame identifiers 418 comprised in the set of decoded tagged video frames 416. At 606, one or more quality metrics may be determined by comparing the set of tagged video frames to a set of reference video frames based on the frame identifications. For example, analysis component 414 of FIG. 4 may be operative to determine one or more quality metrics 422 by comparing the set of decoded tagged video frames 416 to a set of reference video frames 424 based on the frame identifications 420 for the set of decoded tagged video frames 416 and on reference frame identifications 426 for the set of reference video frames 424. The embodiments are not limited to these examples.

FIG. 7 illustrates an embodiment of a storage medium 700. The storage medium 700 may comprise an article of manufacture. In one embodiment, the storage medium 700 may comprise any non-transitory computer readable medium or machine readable medium, such as an optical, magnetic or semiconductor storage. The storage medium may store various types of computer executable instructions, such as instructions to implement one or both of logic flows 500 and 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
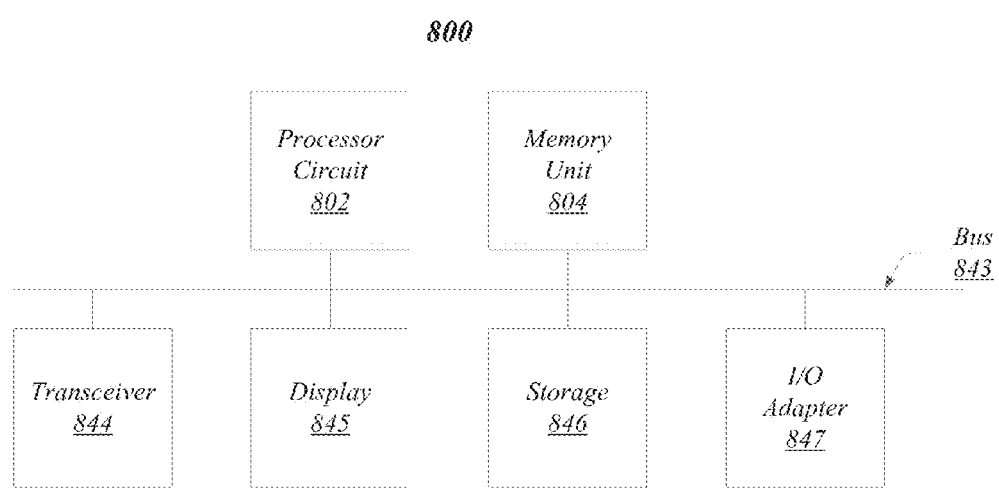
FIG. 8 illustrates one embodiment of a third system.

FIG. 8 illustrates one embodiment of a system 800. In various embodiments, system 800 may be representative of a system or architecture suitable for use with one or more embodiments described herein, such as apparatus 200 and/or system 240 of FIG. 2, apparatus 400 and/or system 440 of FIG. 4, logic flow 500 of FIG. 5, logic flow 600 of FIG. 6, and/or storage medium 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor element 802. Processor element 802 may be implemented using any processor or logic device, and may be the same as or similar to processor element 202 of FIG. 2 and/or processor element 402 of FIG. 4.

In one embodiment, system 800 may include a memory unit 804 to couple to processor element 802. Memory unit 804 may be coupled to processor element 802 via communications bus 843, or by a dedicated communications bus between processor element 802 and memory unit 804, as desired for a given implementation. Memory unit 804 may be implemented using any machine-readable or computer-readable media capable of storing data, including both volatile and non-volatile memory, and may be the same as or similar to memory unit 204 of FIG. 2 and/or memory unit 404 of FIG. 4. In some embodiments, the machine-readable or computer-readable medium may include a non-transitory medium. The embodiments are not limited in this context.

In various embodiments, system 800 may include a transceiver 844. Transceiver 844 may include one or more radios capable of transmitting and receiving signals using various suitable wireless communications techniques, and may be the same as or similar to transceiver 244 of FIG. 2 and/or transceiver 444 of FIG. 4.

In various embodiments, system 800 may include a display 845. Display 845 may comprise any display device capable of displaying information received from processor element 802, and may be the same as or similar to display 245 of FIG. 2 and/or display 445 of FIG. 4. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
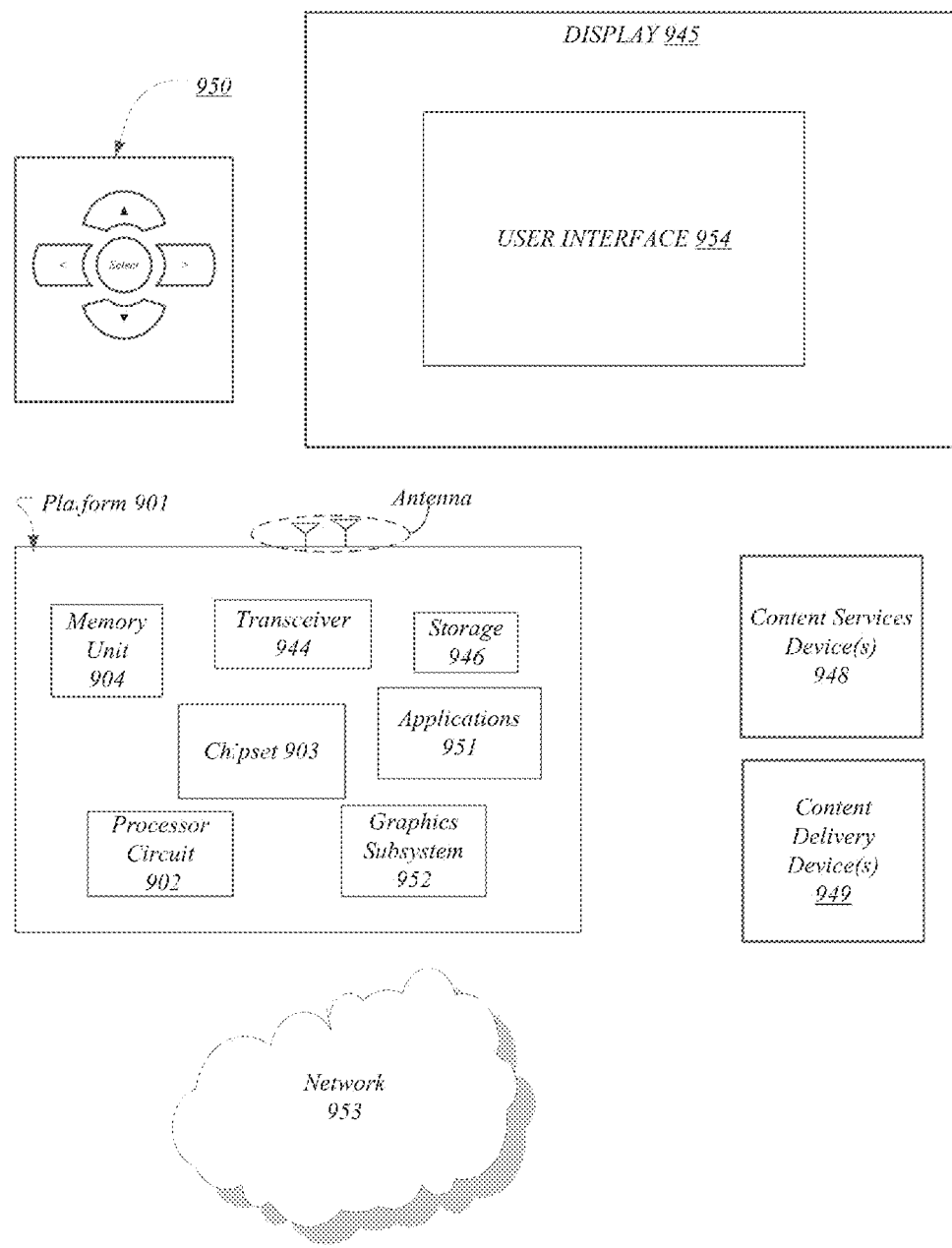
FIG. 9 illustrates one embodiment of a fourth system.

FIG. 9 illustrates an embodiment of a system 900. In various embodiments, system 900 may be representative of a system or architecture suitable for use with one or more embodiments described herein, such as apparatus 200 and/or system 240 of FIG. 2, apparatus 400 and/or system 440 of FIG. 4, logic flow 500 of FIG. 5, logic flow 600 of FIG. 6, storage medium 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor element 902, chipset 903, memory unit 904, transceiver 944, storage 946, applications 951, and/or graphics subsystem 952. Chipset 903 may provide intercommunication among processor element 902, memory unit 904, transceiver 944, storage 946, applications 951, and/or graphics subsystem 952. For example, chipset 903 may include a storage adapter (not depicted) capable of providing intercommunication with storage 946.

Processor element 902 may be implemented using any processor or logic device, and may be the same as or similar to processor element 802 in FIG. 8.

Memory unit 904 may be implemented using any machine-readable or computer-readable media capable of storing data, and may be the same as or similar to memory unit 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor element 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the invention.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
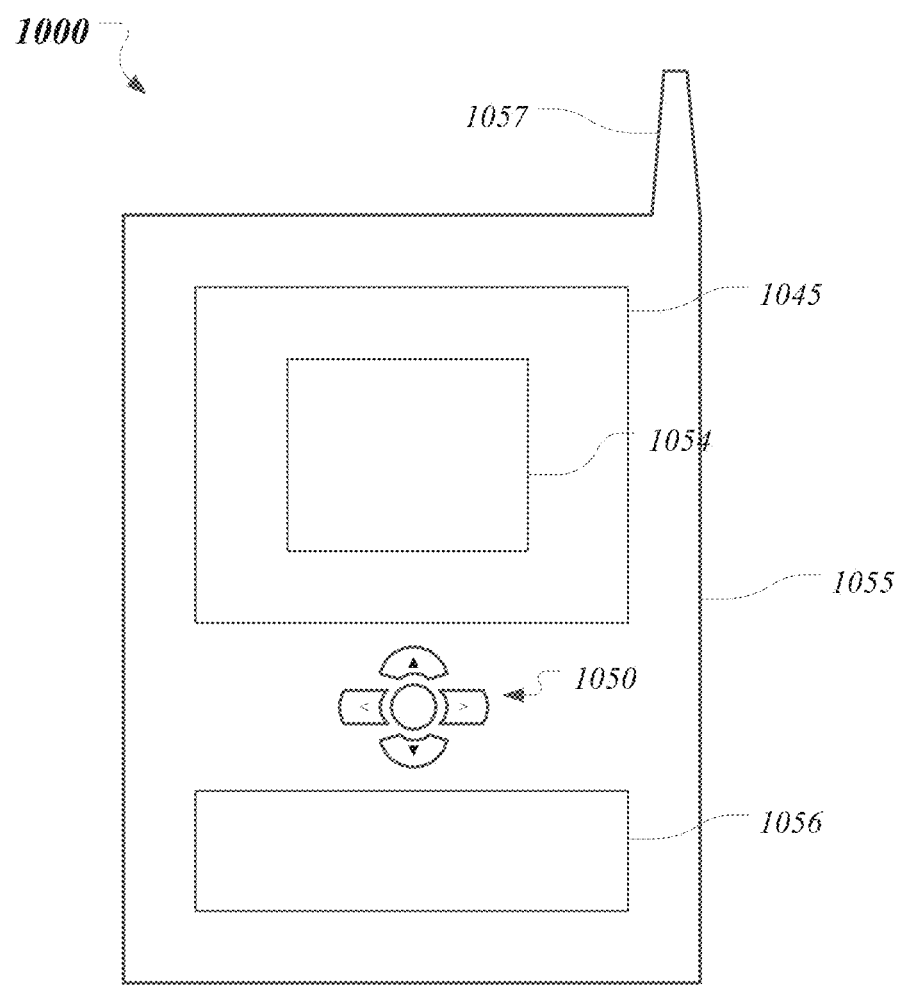
FIG. 10 illustrates one embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within a processor element, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor element. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor element, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a frame identification apparatus, comprising: a processor element; an identification component for execution by the processor element to determine frame identifications for each of a set of tagged video frames based on frame identifiers contained in the tagged video frames, each frame identifier comprising multiple markers, each marker comprising a macroblock pattern corresponding to a symbol according to a frame identification scheme; and an analysis component for execution by the processor element to determine one or more quality metrics by comparing the set of tagged video frames with a set of reference video frames based on the frame identifications.

In Example 2, the one or more quality metrics of Example 1 may optionally comprise frame quality measurements for the set of tagged video frames.

In Example 3, the one or more quality metrics of any one of Examples 1 to 2 may optionally comprise a latency measurement for the set of tagged video frames.

In Example 4, the frame identifications of any one of Examples 1 to 3 may optionally comprise frame numbers for the set of tagged video frames.

In Example 5, each marker in any one of Examples 1 to 4 may optionally comprise a 2 macroblock by 2 macroblock pattern.

In Example 6, the frame identification apparatus of any one of Examples 1 to 5 may optionally comprise a decoding component for execution by the processor element to decode a set of encoded tagged video frames to obtain the set of tagged video frames.

In Example 7, each macroblock in each marker in any one of Examples 1 to 6 may optionally comprise either a white macroblock or a black macroblock.

In Example 8, each marker in any one of Examples 1 to 7 may optionally comprise a macroblock pattern corresponding to a hexadecimal digit.

In Example 9, each frame identifier in any one of Examples 1 to 8 may optionally comprise a reference marker located at a position specified by the frame identification scheme.

Example 10 is at least one machine-readable medium comprising a set of frame identification instructions that, in response to being executed on a computing device, cause the computing device to: determine frame identifications for each of a set of tagged video frames based on frame identifiers contained in the tagged video frames, each frame identifier comprising multiple markers, each marker comprising a macroblock pattern corresponding to a symbol according to a frame identification scheme; and determine one or more quality metrics by comparing the set of tagged video frames with a set of reference video frames based on the frame identifications.

In Example 11, the one or more quality metrics of Example 10 may optionally comprise frame quality measurements for the set of tagged video frames.

In Example 12, the one or more quality metrics of any one of Examples 10 to 11 may optionally comprise a latency measurement for the set of tagged video frames.

In Example 13, the frame identifications of any one of Examples 10 to 12 may optionally comprise frame numbers for the set of tagged video frames.

In Example 14, each marker in any one of Examples 10 to 13 may optionally comprise a 2 macroblock by 2 macroblock pattern.

In Example 15, the at least one machine-readable medium of any one of Examples 10 to 14 may optionally comprise instructions that, in response to being executed on a computing device, cause the computing device to decode a set of encoded tagged video frames to obtain the tagged video frames.

In Example 16, each macroblock in each marker in any one of Examples 10 to 15 may optionally comprise either a white macroblock or a black macroblock.

In Example 17, each marker in any one of Examples 10 to 16 may optionally comprise a macroblock pattern corresponding to a hexadecimal digit.

In Example 18, each frame identifier in any one of Examples 10 to 17 may optionally comprise a reference marker located at a position specified by the frame identification scheme.

Example 19 is a frame identification method, comprising: determining frame identifications for each of a set of tagged video frames based on frame identifiers contained in the tagged video frames, each frame identifier comprising multiple markers, each marker comprising a macroblock pattern corresponding to a symbol according to a frame identification scheme; and determining one or more quality metrics by comparing the set of tagged video frames with a set of reference video frames based on the frame identifications.

In Example 20, the one or more quality metrics of Example 19 may optionally comprise frame quality measurements for the set of tagged video frames.

In Example 21, the one or more quality metrics of any one of Examples 19 to 20 may optionally comprise a latency measurement for the set of tagged video frames.

In Example 22, the frame identifications of any one of Examples 19 to 21 may optionally comprise frame numbers for the set of tagged video frames In Example 23, each marker in any one of Examples 19 to 22 may optionally comprise a 2 macroblock by 2 macroblock pattern.

In Example 24, the frame identification method of any one of Examples 19 to 23 may optionally comprise decoding a set of encoded tagged video frames to obtain the tagged video frames.

In Example 25, each macroblock in each marker in any one of Examples 19 to 24 may optionally comprise either a white macroblock or a black macroblock.

In Example 26, each marker in any one of Examples 19 to 25 may optionally comprise a macroblock pattern corresponding to a hexadecimal digit.

In Example 27, each frame identifier in any one of Examples 19 to 26 may optionally comprise a reference marker located at a position specified by the frame identification scheme.

Example 28 is at least one machine-readable medium comprising a plurality of instructions that, in response to being executed on a computing device, cause the computing device to perform a frame identification method according to any one of Examples 19 to 27.

Example 29 is an apparatus, comprising means for performing a frame identification method according to any one of Examples 19 to 27.

Example 30 is a frame identification system, comprising: an apparatus according to Example 29; and a transceiver to receive the encoded tagged video frames over a wireless connection from a remote device.

Example 31 is a communications device arranged to perform a frame identification method according to any one of Examples 19 to 27.

Example 32 is a frame identification system, comprising: an apparatus according to any one of Examples 1 to 9; and a transceiver coupled to the processor element, the transceiver operative to receive the encoded tagged video frames over a wireless connection from a remote device.

In Example 33, the frame identification system of Example 32 may optionally comprise a display to display the set of tagged video frames.

Example 34 is a video processing apparatus, comprising: a processor element; an insertion component for execution by the processor element to insert a frame identifier into each of a set of video frames to obtain a set of tagged video frames, each frame identifier comprising multiple markers, each marker comprising a macroblock pattern corresponding to a symbol according to a frame identification scheme; and an encoding component for execution by the processor element to encode the set of tagged video frames for wireless transmission to a display.

In Example 35, each marker in Example 34 may optionally comprise a macroblock pattern corresponding to a hexadecimal digit.

In Example 36, the frame identifier for each video frame in any one of Examples 34 to 35 may optionally indicate a frame number for that video frame.

In Example 37, each frame identifier in any one of Examples 34 to 36 may optionally comprise a reference marker located at a position specified by the frame identification scheme.

In Example 38, each marker in any one of Examples 34 to 37 may optionally comprise a 2 macroblock by 2 macroblock pattern.

In Example 39, the video processing apparatus of any one of Examples 34 to 38 may optionally comprise a decoding component for execution by the processor element to obtain the set of video frames by decoding a video content item.

In Example 40, each macroblock in each marker in any one of Examples 34 to 39 may optionally comprise either a white macroblock or a black macroblock.

Example 41 is at least one machine-readable medium comprising a set of video processing instructions that, in response to being executed on a computing device, cause the computing device to: insert a frame identifier into each of a set of video frames to obtain a set of tagged video frames, each frame identifier comprising multiple markers, each marker comprising a macroblock pattern corresponding to a symbol according to a frame identification scheme; and encode the set of tagged video frames for wireless transmission to a display.

In Example 42, each marker in Example 41 may optionally comprise a macroblock pattern corresponding to a hexadecimal digit.

In Example 43, the frame identifier for each video frame in any one of Examples 41 to 42 may optionally indicate a frame number for that video frame.

In Example 44, each frame identifier in any one of Examples 41 to 43 may optionally comprise a reference marker located at a position specified by the frame identification scheme.

In Example 45, each marker in any one of Examples 41 to 44 may optionally comprise a 2 macroblock by 2 macroblock pattern.

In Example 46, the at least one machine-readable medium of any one of Examples 41 to 45 may optionally comprise video processing instructions that, in response to being executed on a computing device, cause the computing device to obtain the set of video frames by decoding a video content item.

In Example 47, each macroblock in each marker in any one of Examples 41 to 46 may optionally comprise either a white macroblock or a black macroblock.

Example 48 is a video processing method, comprising: inserting a frame identifier into each of a set of video frames to obtain a set of tagged video frames, each frame identifier comprising multiple markers, each marker comprising a macroblock pattern corresponding to a symbol according to a frame identification scheme; and encoding the set of tagged video frames for wireless transmission to a display.

In Example 49, each marker in Example 48 may optionally comprise a macroblock pattern corresponding to a hexadecimal digit.

In Example 50, the frame identifier for each video frame in any one of Examples 48 to 49 may optionally indicate a frame number for that video frame.

In Example 51, each frame identifier in any one of Examples 48 to 50 may optionally comprise a reference marker located at a position specified by the frame identification scheme.

In Example 52, each marker in any one of Examples 48 to 51 may optionally comprise a 2 macroblock by 2 macroblock pattern.

In Example 53, the video processing method of any one of Examples 48 to 52 may optionally comprise obtaining the set of video frames by decoding a video content item.

In Example 54, each macroblock in each marker in any one of Examples 48 to 53 may optionally comprise either a white macroblock or a black macroblock.

Example 55 is at least one machine-readable medium comprising a plurality of instructions that, in response to being executed on a computing device, cause the computing device to perform a video processing method according to any one of Examples 48 to 54.

Example 56 is an apparatus, comprising means for performing a video processing method according to any one of Examples 48 to 54.

Example 57 is a video processing system, comprising: an apparatus according to Example 56; and a transceiver to transmit the encoded tagged video frames over a wireless connection to a remote device.

Example 58 is a communications device arranged to perform a video processing method according to any one of Examples 48 to 54.

Example 59 is a video processing system, comprising: an apparatus according to any one of Examples 34 to 40; and a transceiver coupled to the processor element, the transceiver operative to transmit the encoded tagged video frames over a wireless connection to a remote device.

In Example 60, the video processing system of Example 59 may optionally comprise a display to display the set of video frames.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
 a processor element;
 an identification component for execution by the processor element to determine frame identifications for each of a set of tagged video frames based on frame identifiers contained in the tagged video frames, each frame identifier comprising multiple markers, each marker comprising a respective macroblock pattern corresponding to a symbol according to a frame identification scheme, each macroblock pattern to comprise a respective arrangement of multiple macroblocks, each of the multiple macroblocks to comprise either a black macroblock or a white macroblock; and
 an analysis component for execution by the processor element to determine one or more quality metrics by comparing the set of tagged video frames with a set of reference video frames based on the frame identifications.

2. The apparatus of claim 1, the one or more quality metrics comprising frame quality measurements for the set of tagged video frames.

3. The apparatus of claim 1, the one or more quality metrics comprising a latency measurement for the set of tagged video frames.

4. The apparatus of claim 1, the frame identifications comprising frame numbers for the set of tagged video frames.

5. The apparatus of claim 1 each marker comprising a 2macroblock by 2 macroblock pattern.

6. The apparatus of claim 1, comprising a decoding component for execution by the processor element to decode a set of encoded tagged video frames to obtain the set of tagged video frames.

7. The apparatus of claim 1, comprising:
a transceiver coupled to the processor element, the transceiver operative to receive the encoded tagged video frames over a wireless connection from a remote device; and
a display to display the set of tagged video frames.

8. At least one non-transitory machine-readable medium comprising a set of instructions that, in response to being executed on a computing device, cause the computing device to:
determine frame identifications for each of a set of tagged video frames based on frame identifiers contained in the tagged video frames, each frame identifier comprising multiple markers, each marker comprising a respective macroblock pattern corresponding to a symbol according to a frame identification scheme, each macroblock pattern to comprise a respective arrangement of multiple macroblocks, each of the multiple macroblocks to comprise either a black macroblock or a white macroblock; and
determine one or more quality metrics by comparing the set of tagged video frames with a set of reference video frames based on the frame identifications.

9. The at least one non-transitory machine-readable medium of claim 8, the one or more quality metrics comprising frame quality measurements for the set of tagged video frames.

10. The at least one non-transitory machine-readable medium of claim 8, the one or more quality metrics comprising a latency measurement for the set of tagged video frames.

11. The at least one non-transitory machine-readable medium of claim 8, the frame identifications comprising frame numbers for the set of tagged video frames.

12. The at least one non-transitory machine-readable medium of claim 8, each marker comprising a 2 macroblock by 2 macroblock pattern.

13. The at least one non-transitory machine-readable medium of claim 8, comprising instructions that, in response to being executed on a computing device, cause the computing device to decode a set of encoded tagged video frames to obtain the tagged video frames.

14. An apparatus, comprising:
a processor element;
an insertion component for execution by the processor element to insert a frame identifier into each of a set of video frames to obtain a set of tagged video frames, each frame identifier comprising multiple markers, each marker comprising a respective macroblock pattern corresponding to a symbol according to a frame identification scheme, each macroblock pattern to comprise a respective arrangement of multiple macroblocks, each of the multiple macroblocks to comprise either a black macroblock or a white macroblock; and
an encoding component for execution by the processor element to encode the set of tagged video frames for wireless transmission to a display.

15. The apparatus of claim 14 each marker comprising a macroblock pattern corresponding to a hexadecimal digit.

16. The apparatus of claim 14, the frame identifier for each video frame indicating a frame number for that video frame.

17. The apparatus of claim 14, each frame identifier comprising a reference marker located at a position specified by the frame identification scheme.

18. The apparatus of claim 14, each marker comprising a 2macroblock by 2 macroblock pattern.

19. The apparatus of claim 14, comprising a decoding component for execution by the processor element to obtain the set of video frames by decoding a video content item.

20. At least one non-transitory machine-readable medium comprising a set of instructions that, in response to being executed on a computing device, cause the computing device to:
insert a frame identifier into each of a set of video frames to obtain a set of tagged video frames, each frame identifier comprising multiple markers, each marker comprising a respective macroblock pattern corresponding to a symbol according to a frame identification scheme, each macroblock pattern to comprise a respective arrangement of multiple macroblocks, each of the multiple macroblocks to comprise either a black macroblock or a white macroblock; and
encode the set of tagged video frames for wireless transmission to a display.

21. The at least one non-transitory machine-readable medium of claim 20, each marker comprising a macroblock pattern corresponding to a hexadecimal digit.

22. The at least one non-transitory machine-readable medium of claim 20, the frame identifier for each video frame indicating a frame number for that video frame.

23. The at least one non-transitory machine-readable medium of claim 20, each frame identifier comprising a reference marker located at a position specified by the frame identification scheme.

24. The at least one non-transitory machine-readable medium of claim 20, each marker comprising a 2 macroblock by 2 macroblock pattern.

25. The at least one non-transitory machine-readable medium of claim 20, comprising instructions that, in response to being executed on a computing device, cause the computing device to obtain the set of video frames by decoding a video content item.

* * * * *